(12) United States Patent
Tanaka

(10) Patent No.: US 8,977,675 B2
(45) Date of Patent: Mar. 10, 2015

(54) METHODS AND SYSTEMS FOR PROVIDING TIME AND DATE SPECIFIC SOFTWARE USER INTERFACES

(75) Inventor: Jay Tanaka, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 281 days.

(21) Appl. No.: 12/831,196

(22) Filed: Jul. 6, 2010

(65) Prior Publication Data

US 2011/0238736 A1 Sep. 29, 2011

Related U.S. Application Data

(60) Provisional application No. 61/317,973, filed on Mar. 26, 2010.

(51) Int. Cl.
*G06F 15/16* (2006.01)
*G06F 9/50* (2006.01)

(52) U.S. Cl.
CPC .................................. *G06F 9/5011* (2013.01)
USPC ....................................................... 709/203

(58) Field of Classification Search
CPC .................................................... G06F 9/5011
USPC ............................................ 709/203; 715/811
See application file for complete search history.

(56) References Cited

U.S. PATENT DOCUMENTS

| 5,072,370 A | 12/1991 | Durdik |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,787,437 A | 7/1998 | Potterveld et al. |
| 5,794,232 A | 8/1998 | Mahlum et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

FOREIGN PATENT DOCUMENTS

WO 2004059420 7/2004

OTHER PUBLICATIONS

[online]; [published on Oct. 17, 2008]; [retrieved on Feb. 26, 2010]; retrieved from http://en.wikipedia.org/wiki/Push_technology.

(Continued)

*Primary Examiner* — David X Yi
(74) *Attorney, Agent, or Firm* — Weaver Austin Villeneuve & Sampson

(57) ABSTRACT

Computer systems, methods and software for responding to remote clients with content selected based on when the request is made. The method may include selecting one or more interface components based on the time of day and/or date of the request, and returning a response including the selected interface components. The method may include adjusting the time for a time zone for the remote client and/or user. Interface components may be fully embedded in the response, or may be references to external components. Interface components may include data relating to a user task associated with the date and/or time of day, formatting information for displaying the task data to the user of the remote client, instructions for user interaction with the task data, etc.

17 Claims, 8 Drawing Sheets

(56) References Cited

U.S. PATENT DOCUMENTS

| | | | |
|---|---|---|---|
| 5,873,096 | A | 2/1999 | Lim et al. |
| 5,918,159 | A | 6/1999 | Fomukong et al. |
| 5,941,947 | A | 8/1999 | Brown et al. |
| 5,950,190 | A | 9/1999 | Yeager et al. |
| 5,963,953 | A | 10/1999 | Cram et al. |
| 5,974,409 | A | 10/1999 | Sanu et al. |
| 5,983,227 | A | 11/1999 | Nazem et al. |
| 5,987,471 | A | 11/1999 | Bodine et al. |
| 6,064,656 | A | 5/2000 | Angal et al. |
| 6,085,191 | A | 7/2000 | Fisher et al. |
| 6,092,083 | A | 7/2000 | Brodersen et al. |
| 6,112,198 | A | 8/2000 | Lohman et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,000 | B1 | 2/2001 | Gwertzman et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,219,667 | B1 | 4/2001 | Lu et al. |
| 6,226,641 | B1 | 5/2001 | Hickson et al. |
| 6,233,617 | B1 | 5/2001 | Rothwein et al. |
| 6,233,618 | B1 | 5/2001 | Shannon |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,330,560 | B1 | 12/2001 | Harrison et al. |
| 6,332,127 | B1 * | 12/2001 | Bandera et al. ............ 705/14.55 |
| 6,336,137 | B1 | 1/2002 | Lee et al. |
| 6,341,288 | B1 | 1/2002 | Yach et al. |
| 6,345,288 | B1 | 2/2002 | Reed et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,438,562 | B1 | 8/2002 | Gupta et al. |
| 6,446,089 | B1 | 9/2002 | Brodersen et al. |
| 6,446,109 | B2 | 9/2002 | Gupta |
| 6,453,038 | B1 | 9/2002 | McFarlane et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,578,037 | B1 | 6/2003 | Wong et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,148 | B1 | 8/2003 | Salo et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,658,417 | B1 | 12/2003 | Statukis et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,721,765 | B2 | 4/2004 | Ghosh et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,839,680 | B1 | 1/2005 | Liu et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 6,944,133 | B2 | 9/2005 | Wisner et al. |
| 6,947,927 | B2 | 9/2005 | Chaudhuri et al. |
| 7,062,502 | B1 | 6/2006 | Kesler |
| 7,069,497 | B1 | 6/2006 | Desai |
| 7,076,633 | B2 | 7/2006 | Tormasov et al. |
| 7,100,111 | B2 | 8/2006 | McElfresh et al. |
| 7,152,109 | B2 | 12/2006 | Suorsa et al. |
| 7,174,483 | B2 | 2/2007 | Worrall et al. |
| 7,181,758 | B1 | 2/2007 | Chan |
| 7,185,192 | B1 | 2/2007 | Kahn |
| 7,206,805 | B1 | 4/2007 | McLaughlin, Jr. |
| 7,206,807 | B2 | 4/2007 | Cheenath |
| 7,209,929 | B2 | 4/2007 | Dominguez, Jr. et al. |
| 7,249,118 | B2 | 7/2007 | Sandler et al. |
| 7,269,590 | B2 | 9/2007 | Hull et al. |
| 7,289,976 | B2 | 10/2007 | Kihneman et al. |
| 7,305,577 | B2 | 12/2007 | Zhang |
| 7,308,704 | B2 | 12/2007 | Vogel et al. |
| 7,340,411 | B2 | 3/2008 | Cook |
| 7,350,237 | B2 | 3/2008 | Vogel et al. |
| 7,356,482 | B2 | 4/2008 | Frankland et al. |
| 7,373,364 | B1 | 5/2008 | Chapman |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,448,079 | B2 | 11/2008 | Tremain |
| 7,454,509 | B2 | 11/2008 | Boulter et al. |
| 7,484,219 | B2 | 1/2009 | Mitra |
| 7,508,789 | B2 | 3/2009 | Chan |
| 7,529,728 | B2 | 5/2009 | Weissman et al. |
| 7,577,092 | B2 | 8/2009 | San Andres et al. |
| 7,580,975 | B2 | 8/2009 | Cheenath |
| 7,599,935 | B2 | 10/2009 | La Rotonda et al. |
| 7,599,953 | B2 | 10/2009 | Galindo-Legaria et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,661,027 | B2 | 2/2010 | Langen et al. |
| 7,668,861 | B2 | 2/2010 | Steven |
| 7,693,820 | B2 | 4/2010 | Larson et al. |
| 7,698,160 | B2 | 4/2010 | Beaven et al. |
| 7,730,478 | B2 | 6/2010 | Weissman |
| 7,734,608 | B2 | 6/2010 | Fell et al. |
| 7,747,648 | B1 | 6/2010 | Kraft et al. |
| 7,769,825 | B2 | 8/2010 | Karakashian et al. |
| 7,774,366 | B2 | 8/2010 | Fisher et al. |
| 7,779,039 | B2 | 8/2010 | Weissman et al. |
| 7,779,475 | B2 | 8/2010 | Jakobson et al. |
| 7,814,052 | B2 | 10/2010 | Bezar et al. |
| 7,814,470 | B2 | 10/2010 | Mamou et al. |
| 7,827,138 | B2 | 11/2010 | Salmon et al. |
| 7,827,208 | B2 | 11/2010 | Bosworth et al. |
| 7,849,401 | B2 | 12/2010 | Elsa et al. |
| 7,853,881 | B1 | 12/2010 | Assal et al. |
| 7,945,653 | B2 | 5/2011 | Zuckerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah |

(56) References Cited

U.S. PATENT DOCUMENTS

| | | |
|---|---|---|
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0023440 A1 | 9/2001 | Franklin et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0111410 A1 | 6/2004 | Burgoon et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2007/0078705 A1 | 4/2007 | Abels et al. |
| 2007/0088741 A1 | 4/2007 | Brooks et al. |
| 2007/0124276 A1 | 5/2007 | Weissman et al. |
| 2007/0130130 A1 | 6/2007 | Chan et al. |
| 2007/0130137 A1 | 6/2007 | Oliver et al. |
| 2007/0150546 A1 | 6/2007 | Karakashian et al. |
| 2007/0226640 A1 | 9/2007 | Holbrook et al. |
| 2008/0010243 A1 | 1/2008 | Weissman et al. |
| 2008/0082540 A1 | 4/2008 | Weissman et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0162544 A1 | 7/2008 | Weissman et al. |
| 2008/0201701 A1 | 8/2008 | Hofhansel et al. |
| 2008/0215560 A1 | 9/2008 | Bell et al. |
| 2008/0249972 A1 | 10/2008 | Dillon |
| 2008/0270354 A1 | 10/2008 | Weissman et al. |
| 2008/0270987 A1 | 10/2008 | Weissman et al. |
| 2009/0030906 A1 | 1/2009 | Doshi et al. |
| 2009/0049065 A1 | 2/2009 | Weissman et al. |
| 2009/0049101 A1 | 2/2009 | Weissman et al. |
| 2009/0049102 A1 | 2/2009 | Weissman et al. |
| 2009/0049288 A1 | 2/2009 | Weissman et al. |
| 2009/0063415 A1 | 3/2009 | Chatfield et al. |
| 2009/0100342 A1 | 4/2009 | Jakobson |
| 2009/0164283 A1* | 6/2009 | Coley ............................... 705/7 |
| 2009/0177744 A1 | 7/2009 | Marlow et al. |
| 2009/0276395 A1 | 11/2009 | Weissman et al. |
| 2009/0276405 A1 | 11/2009 | Weissman et al. |
| 2009/0282045 A1 | 11/2009 | Hsieh et al. |
| 2009/0319529 A1 | 12/2009 | Bartlett et al. |
| 2010/0191719 A1 | 7/2010 | Weissman et al. |
| 2010/0205216 A1 | 8/2010 | Durdik et al. |
| 2010/0211619 A1 | 8/2010 | Weissman et al. |
| 2010/0223284 A1 | 9/2010 | Brooks et al. |
| 2010/0235837 A1 | 9/2010 | Weissman et al. |
| 2010/0274779 A1 | 10/2010 | Weissman et al. |
| 2011/0066977 A1* | 3/2011 | DeLuca et al. ................ 715/811 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

[online]; [published on Oct. 16, 2008]; [retrieved on Feb. 26, 2010]; retrieved from http://en.wikipedia.org/wiki/Customer_Relationship_Management.

[online]; [published on Apr. 22, 2008]; [retrieved on Feb. 26, 2010]; retrieved from http://en.wikipedia.org/wiki/Flat_file_database.

[online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

(56) References Cited

OTHER PUBLICATIONS

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

First named inventor: Yancey, Scott, U.S. Appl. No. 12/197,979, filed Aug. 25, 2008.

First named inventor: Calahan, Patrick, U.S. Appl. No. 12/954,556, filed Nov. 24, 2010.

First named inventor: Varadharajan, Arunkumaran, U.S. Appl. No. 12/909,820, filed Oct. 21, 2010.

First named inventor: Pin, Oliver, U.S. Appl. No. 12/895,833, filed Sep. 30, 2010.

First named inventor: Press, William A., U.S. Appl. No. 12/850,502, filed Aug. 4, 2010.

First named inventor: Tanaka, Jay, U.S. Appl. No. 12/831,209, filed Jul. 6, 2010.

First named inventor: Williams, Alexis, U.S. Appl. No. 13/028,236, filed Feb. 16, 2011.

"Google Plus Users", Google+Ripples, Oct. 31, 2011 [retrieved on Feb. 21, 2012 from Internet at http://www.googleplusers.com/google-ripples.html], 3 pages.

\* cited by examiner (BACKGROUND)**

(BACKGROUND)**

METHODS AND SYSTEMS FOR PROVIDING TIME AND DATE SPECIFIC SOFTWARE USER INTERFACES

CROSS-REFERENCE TO RELATED PATENT APPLICATIONS

This application claims the benefit of U.S. Provisional Application No. 61/317,973 filed on Mar. 26, 2010 entitled METHOD FOR PROVIDING TIME AND DATE SPECIFIC COMPUTER INTERFACES AND HAVING Jay Tanaka listed as the inventor.

BACKGROUND

The present invention generally relates to the computer systems, methods, and software for responding to remote client requests. More specifically, embodiments of the present invention pertain to responding to remote clients with content selected based on when the request is made.

Typical Web systems employ HTTP (Hypertext Transfer Protocol) as a communication protocol used between a Web browser and a Web server (i.e., HTTP server). In HTTP, communication is initiated by the Web browser. Namely, one HTTP communication is comprised of an HTTP request issued by the Web browser and an HTTP response returned by the Web server in response to the HTTP request.

Referring now to FIG. 1, a response 100 from a web server typically includes a response header 101 and a body 102. The header 101 may include cookies 110, such as a session id 111 which the Web browser can return to associate future requests with a single session. The body 102 typically comprises an HTML "page" 120 that includes both data and formatting information for display to a user of the Web browser. Many conventional Web applications divide a display area into interface components (e.g., portlets, sidebars, banners, etc.), where each component is associated with a particular task or type of data and given a portion of the Web browser display area.

FIG. 2 shows an exemplary web page display area 240 with a banner area 241, and sidebar area 242, and a main body area 243. Sidebar area 242 is further divided into areas 245, 246, and 247. These interface components may be incorporated within the body of a response within HTML sections such as <div> tags 141, 142, and 143 of FIG. 1) or may be references to external data (e.g., data to be retrieved by further HTTP requests) with HTML sections such as <iframe> tags 145, 146, and 147. An HTML page may also include interface components such as cascading style sheets (CSS) (e.g., <style> tag 132) and JavaScript code (e.g., <script> tag 131) to further define and/or customize the layout, formatting, behavior, and other attributes of the HTML page.

The user of a Web browser typically communicates with the Web server via a series of HTTP requests and responses. Each response typically provides links or other interface affordances (e.g., forms, JavaScript actions, etc.) to retrieve data and/or to perform tasks. Typically, a web page is built from the same set of interface components every time the user accesses a given Web page or application, unless new features or added or the user manually changes one or more of the interface components. For example, in a portal application the user may have configured a sports section, a financial news section, and a stock price section. When the user visits the portal Web application, the interface components are selected from the sections selected by the user. The same interface components are selected displayed every time the user visits the "home" page of the Web application. Thus, the user interface for a Web application generally remains the same, independent of the time of day, day of the week, day of the year, etc.

SUMMARY OF THE INVENTION

It would be beneficial to the user if the Web server were to change the user interface dynamically depending on the time at which the Web server is accessed in order to give the user quicker, easier, or automatic access to items, pages, data, or screens they need, without them having to explicitly select or request them. The embodiments described herein include methods and systems for responding to remote clients in a time and/or date sensitive manner. An embodiment of a method may include steps of receiving a request from a remote client, determining a time of day and/or a date for the request, selecting one or more interface components based on the time of day and/or date, and returning a response to the client including the selected interface components. In some embodiments, the method includes determining a time zone for the remote client and/or user and selecting one or more of the interface components based on the time adjusted for the time zone.

Interface components may be fully embedded in the response, or may be references to external components. The interface components may include, for example, style and/or formatting information (e.g., cascading style sheet [CSS] data), executable code (e.g., scripts, browser add-ons and extensions, Java applets, ActiveX controls, etc.), structured and/or formatted data, etc. Thus, one or more of the selected interface components may include data relating to a user task, where the task is particularly associated with a date and/or time of day. The interface components may further comprise instructions and/or formatting information for displaying the task data to the user of the remote client. Other interface components may include instructions and/or information (e.g., scripts, html forms, hyperlinks, etc.) for user interaction with the task data.

In an exemplary embodiment, the method may include determining a current time period (e.g., the current business day), determining a time of previous access by the remote client and/or the remote user, and selecting one or more of the interface components based on whether said time of previous access is within said current time period (e.g., to display tasks scheduled for the beginning of the business day).

In some embodiments, the method includes determining a time of previous access by the remote client and/or user and selecting one or more of the interface components based on a duration of a period between the time of previous access and the time of day for the request. In other embodiments, the method includes creating and/or accessing session data corresponding to the request and setting a session duration for the session data based on the time of day (e.g., to provide a longer login session during normal business hours and/or on business days).

In another embodiment, the method may include selecting one or more current time periods from a plurality of predefined time periods (e.g., "morning," "lunchtime," "afternoon", "during business hours," "holiday," etc.) and selecting one or more of the interface components based on the current time period(s).

These and other embodiments are described more fully below.

DETAILED DESCRIPTION OF THE INVENTION

The systems, methods, and software of the present invention provide mechanisms for providing the user of a remote client computer with a web application experience by acting upon time-based values in order to customize, stylize, or differentiate information displayed to the user, to help them work more effectively. Embodiments of the invention may, for example, present sets of data and/or tools adapted to the user's likely needs to help them prioritize and perform tasks at an appropriate time.

FIGS. 3-8 generally show exemplary methods including steps of receiving a request from a remote client, determining a time of day and/or a date for the request, selecting one or more interface components based on the time of day and/or date, and returning a response to the client including the selected interface components. It will be recognized that the methods described herein may be implemented as software instructions to be executed on one or more computer processing systems.

Figure 1:
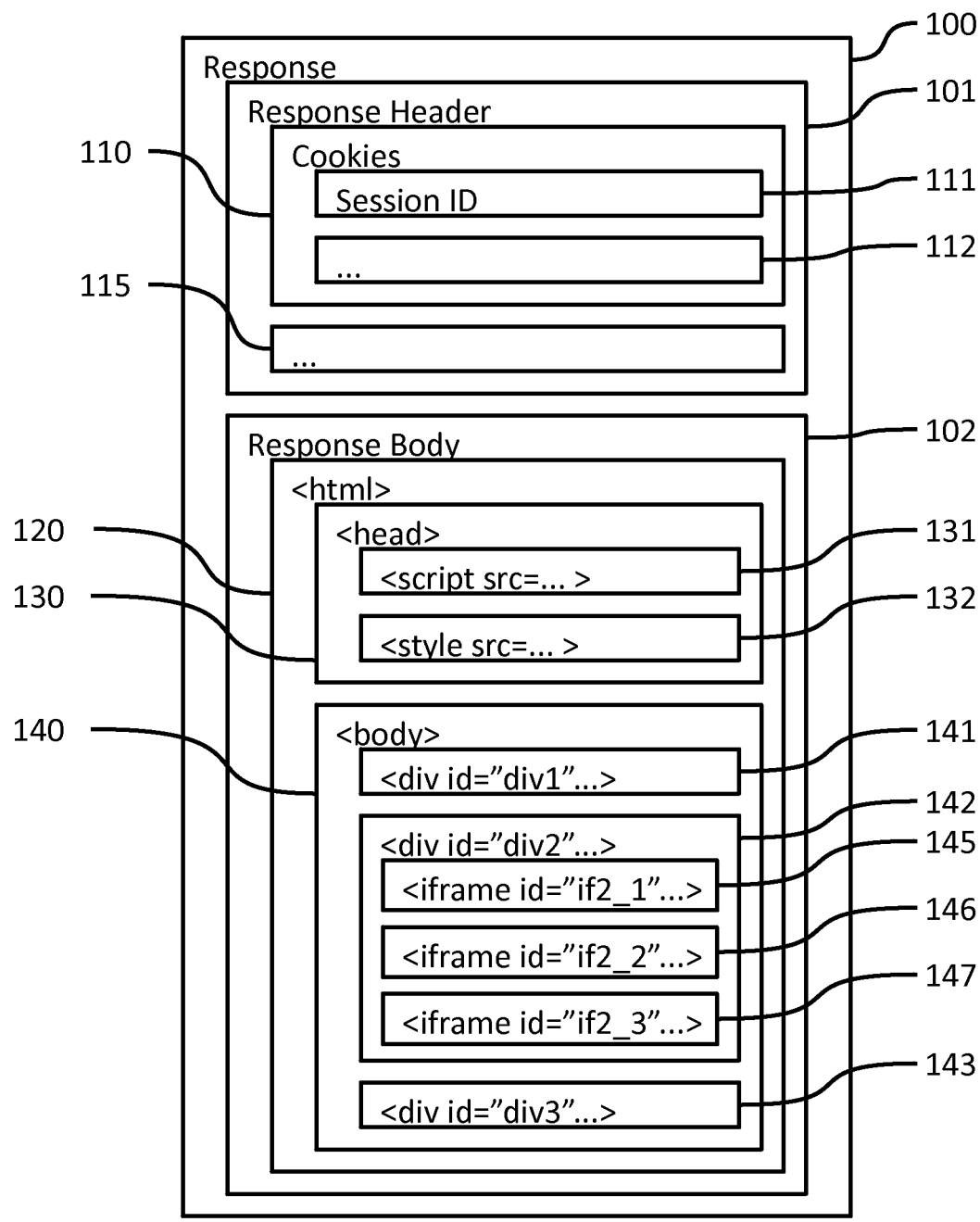
FIG. 1 is a diagram of an exemplary HTTP response.
Figure 2:
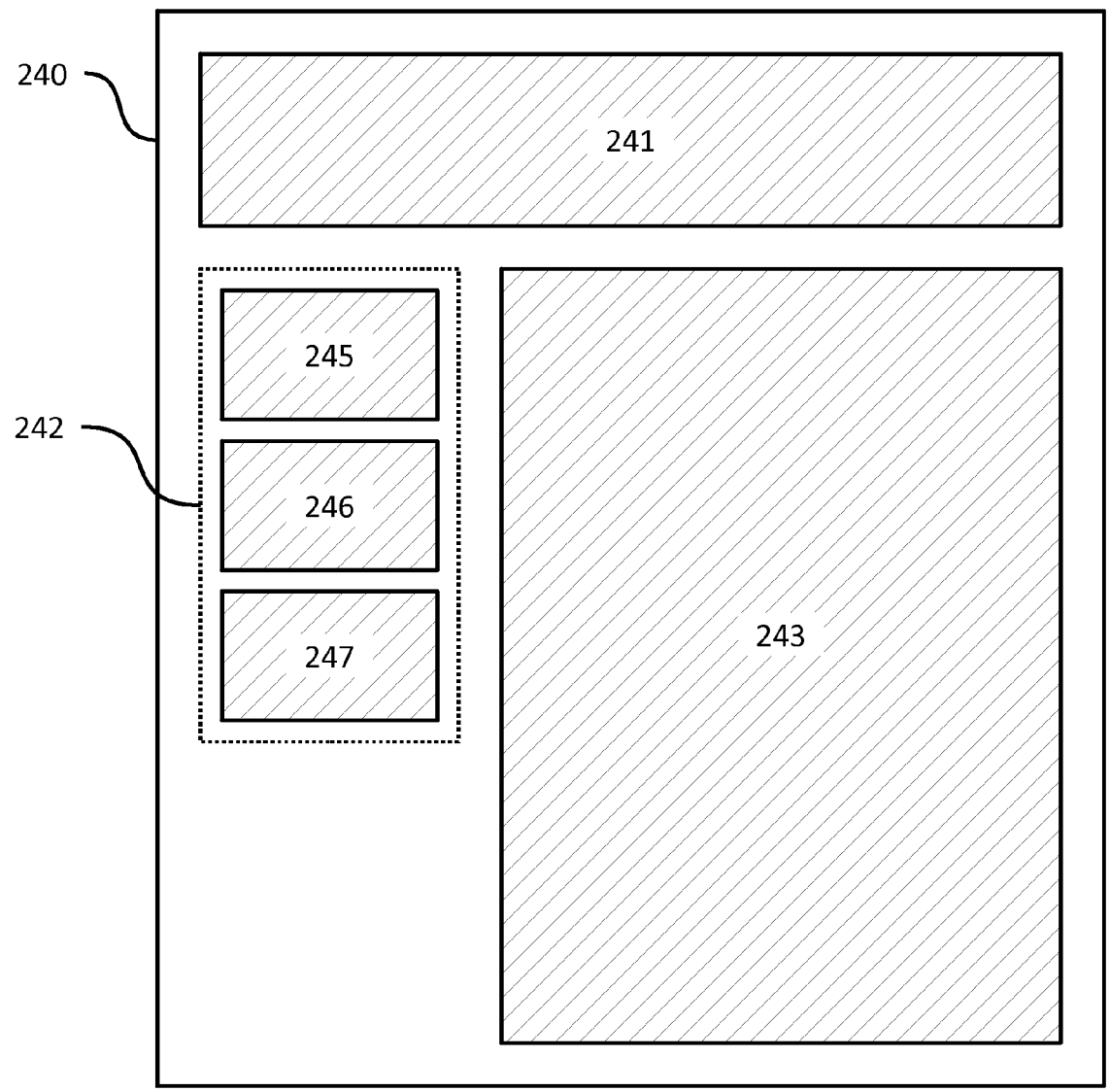
FIG. 2 is a diagram of an exemplary Web page layout.
Figure 3:
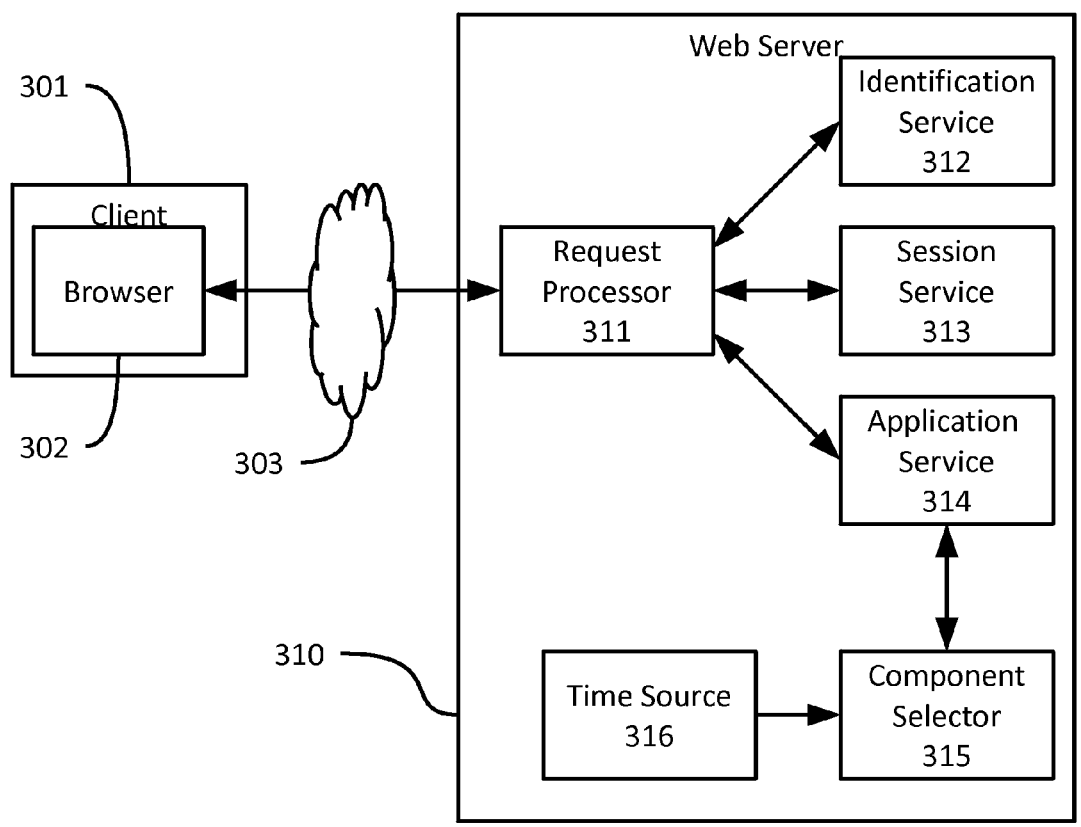
FIG. 3 is a diagram of an exemplary Web application server and client.

FIG. 3 shows an exemplary web server 310 communicating over network 303 with a browser software application 302 running on a client computer system 301. It will be recognized that web server 310 generally includes a plurality of software components, and that any of these components may be running on multiple computer processors, and that each of the exemplary components described herein may be further so subdivided.

Request processor 311 may comprise an HTTP server such as the Apache HTTP server, Microsoft Internet Information Services, etc. While the embodiments herein are generally described in terms of HTTP communication protocols and HTML presentation formats, it will be recognized by those skilled in the art that the concepts are applicable to a wide variety of communication protocols and data formats. Furthermore the client software may include, in addition to web browsers, dashboard applications, sidebars, tickers, etc. In an exemplary implementation, request processor 311 receives a request and parses the request to determine how to respond. Request processor 311 may simply return a data file specified by the request, or may delegate processing to another component (e.g., to application service 314) based on the request. In addition, request processor 311 may communicate with identification server 312 to associate the request with a particular client system and/or user (e.g., based on login credentials provided by the user). Request processor 311 may also communicate with session service 313 to associate the request with user session data (e.g., data stored on the web server in order to maintain a session state between requests).

Application service 314 may comprise a custom web application configured to process one or more types of requests from request processor, or may comprise a conventional web application server or object request broker. In exemplary embodiments, the application service 314 communicates, directly or indirectly, with a component selector 315 configured to receive a time and/or date from time source 316 and to select one or more interface components based on the time of day and/or date.

Component selector 315 may select interface components based on, for example, time of day, day of week, day of month, month within the fiscal quarter, holidays, business days, day or night, typically active time for the user, or off-hours for the user based on their historical norm, number of minutes since the last login, number of minutes since the last view of a given page, screen, or record set, number of minutes since login, number of minutes until the user session will expire, number of minutes since last user session ended, any combination of the above, etc.

Exemplary components that the component selector 315 may select may include landing pages, redirect URLs, or other screens to display after login success or initiation of the application, portlets or summary views to display on a "Home" page, executive dashboard views, dashboard view orders, tab orders, styles, scripts, executable code (e.g., Java Applets, ActiveX controls, Adobe Flash applications), etc. The application service 314 or other components may also adjust other aspects of the response and/or session in response to the time, such as whether previous session data or cookies are reused, session duration, etc.

Figure 4:
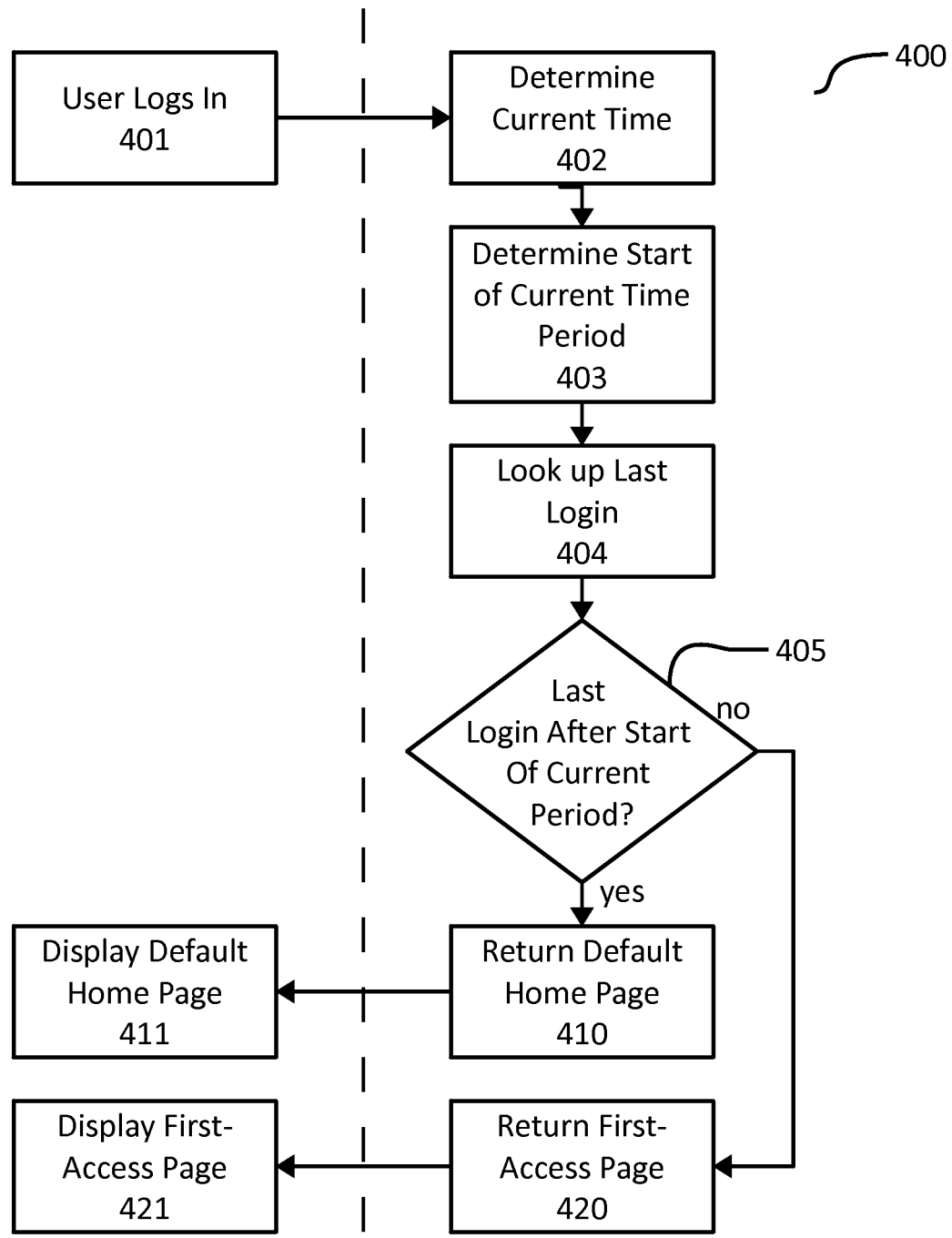
FIG. 4 is a flowchart showing an exemplary method for customizing a response for a user's first access during a time period.

Referring now to FIG. 4, flowchart 400 shows an exemplary method for customizing a response for a user's first access during a time period. At step 401, a user logs in to an application. For example, the user may enter a username and password, or use other login credentials, on a login page for a support case tracking web application. At step 402, the application determines the current time. At step 403, the application uses the current time to determine the current time period and the start time for that period. For example, a "user day" may be configured to begin at 3 A.M. each day.

At step 405, the application determines whether the user has previously logged or otherwise accessed the application after the start of the current period. If the user has previously logged in during the current period, then the application may return a default application home page including a default set of components at step 410. The browser or other client application then displays the default page at step 411. If, however, the user has not logged in to the system since the start of the current period, then the application may proceed to step 420 to return a set of components customized for a "first of the day" page. For example, in a support case tracking web application the "first of the day" page may include one or more components to show support cases and tasks scheduled for the day, cases that have not been updated in the last 72 hours, cases that have been opened since their last "first of the day" login, etc.

Figure 5:
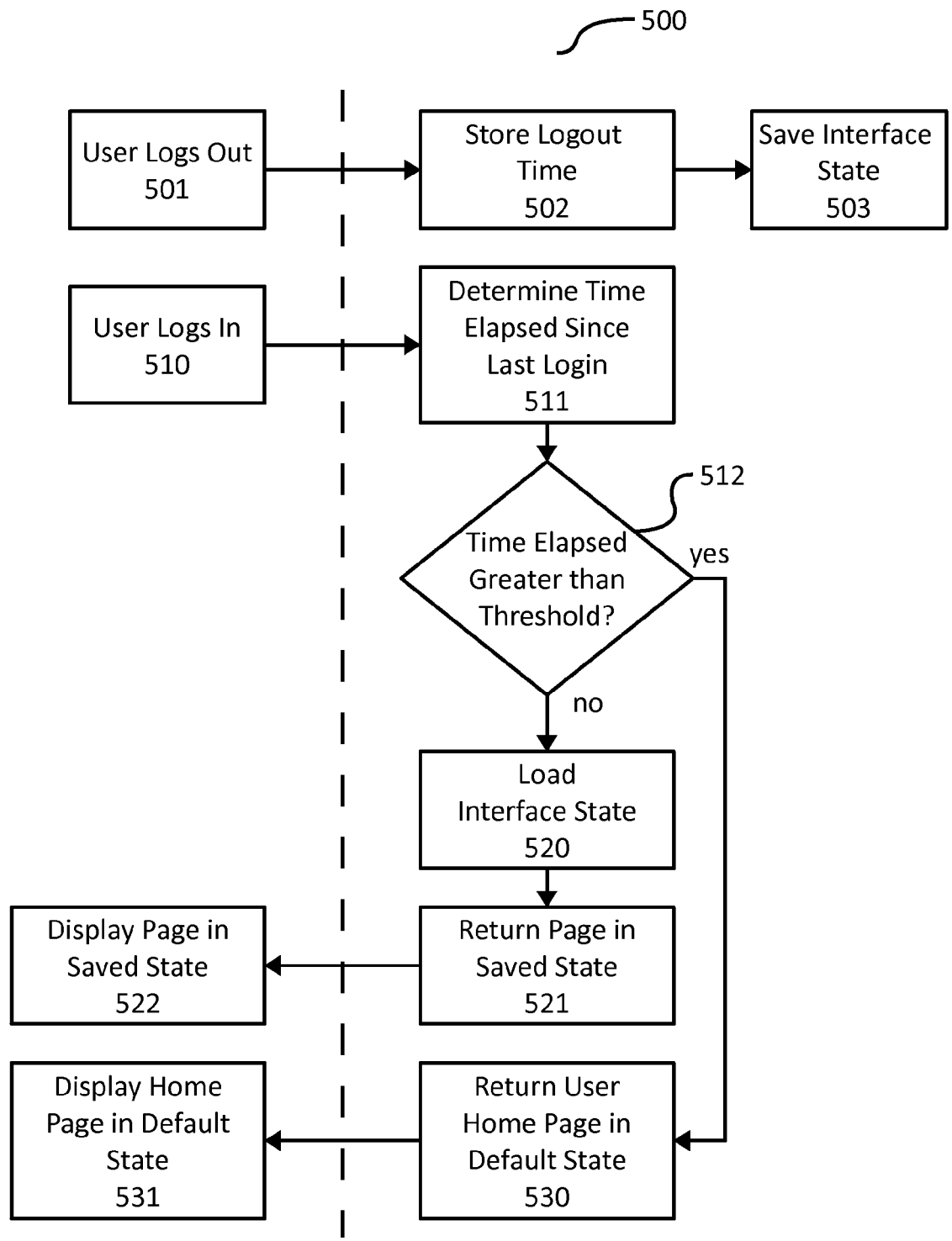
FIG. 5 is a flowchart showing an exemplary method for customizing a response based on the time of a user's previous access.

Referring now to FIG. 5, flowchart 500 shows an exemplary method for customizing a response based on the time of a user's previous access. At step 500, a user of a remote client logs out of the web application. At step 502, in processing the log-out request, the web application stores a time of the logout and at step 503 saves an interface state.

At step 510, the user logs in again. At step 511, the application determines the amount of time elapsed since the last login. At step 512, the application determines whether the time elapsed is greater than some threshold (e.g., one hour). If the time elapsed is not greater than the threshold, then the application loads the saved interface state at step 520 and returns a page in the saved state at step 521. For example, the page with saved state may include persisted values for a current page, search history, navigation tree state, etc. Otherwise, at step 530 the application may return a default home page (e.g., with no search history, a fully closed set of folders in the navigation tree, etc.).

Figure 6:
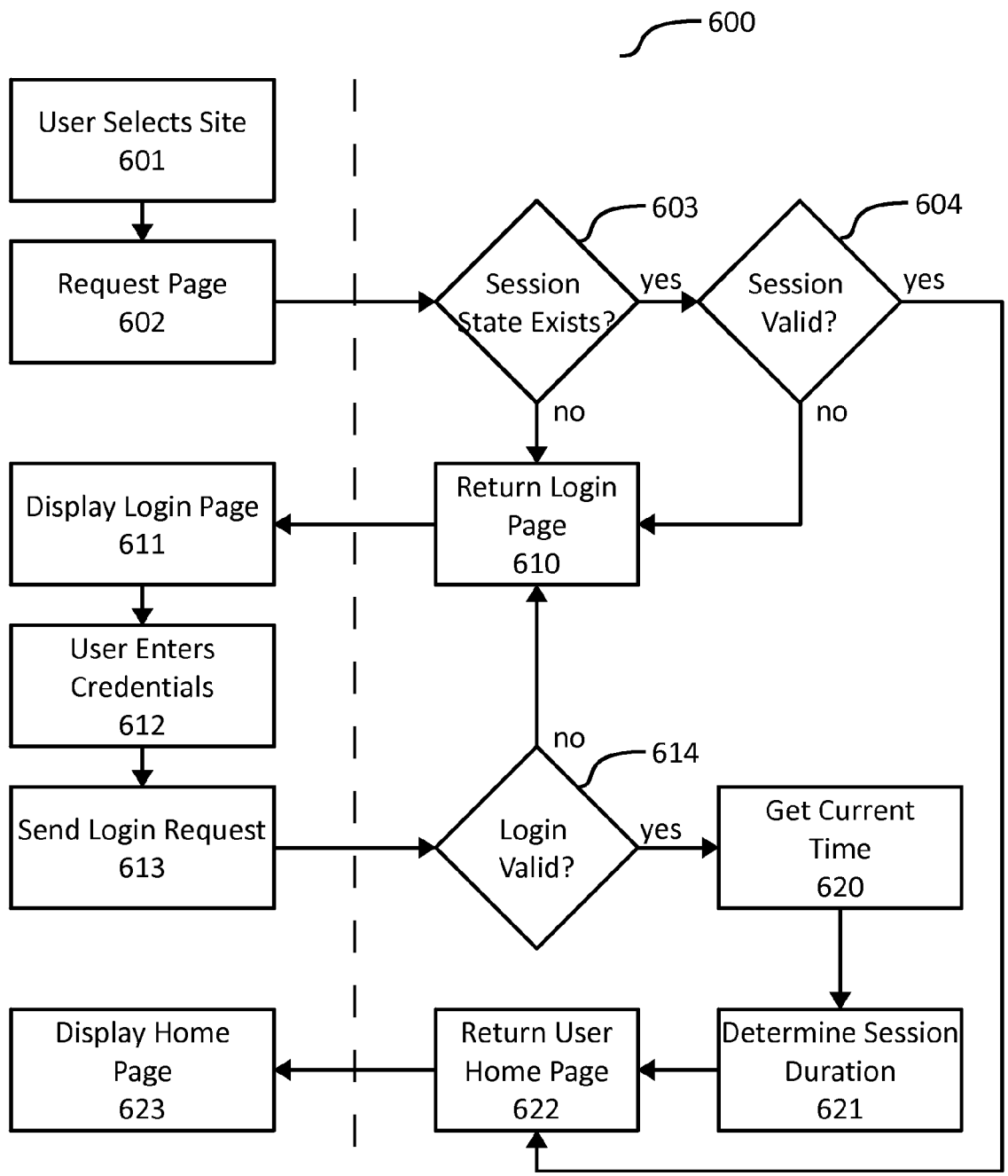
FIG. 6 is a flowchart showing an exemplary method for customizing a response based on the time of login.

Referring now to FIG. 6, flowchart 600 shows an exemplary method for customizing a response based on the time of login. At step 601 a user selects the application site (e.g., from a bookmark/favorites list, from a portal application, etc.) and at step 602 the client browser requests the appropriate page. At step 603 the application determines whether there is any session state associated with the request (e.g., from a session cookie or other parameter included in the request) and at step 604 determines whether the session is valid. If there is no valid session, then at step 610 the application returns a login page. In step 611 the client browser displays the login page. At step 612 the user enters login credentials, and at step 613 the client browser sends a login request to the application. At step 614 the application determines whether the login credentials are valid. If not, the login page is returned again at step 610.

If the login is valid, then the application proceeds to step 620 to determine the current time. At step 621, the application determines the session duration based on the current time. For example, if the current time is within the window of normal business hours Monday-Friday for the company (or user, if per-user values are available), the session may be granted with a duration of eight hours. If the current time is outside of normal business hours, then a different duration may be granted. For example, between 6 am and 8 pm on a normal workday, a four hour session may be granted. Or, a one hour session may be granted. Note that, in this example and all other examples, the duration of a session and the time period to which the duration applies can be defined in a variety of ways. In some implementations, the duration and time period are defined to maximize hardware resources. In other implementations, the duration and time periods are based on business needs, client agreement, or some other factor/combination of factors.

Figure 7:
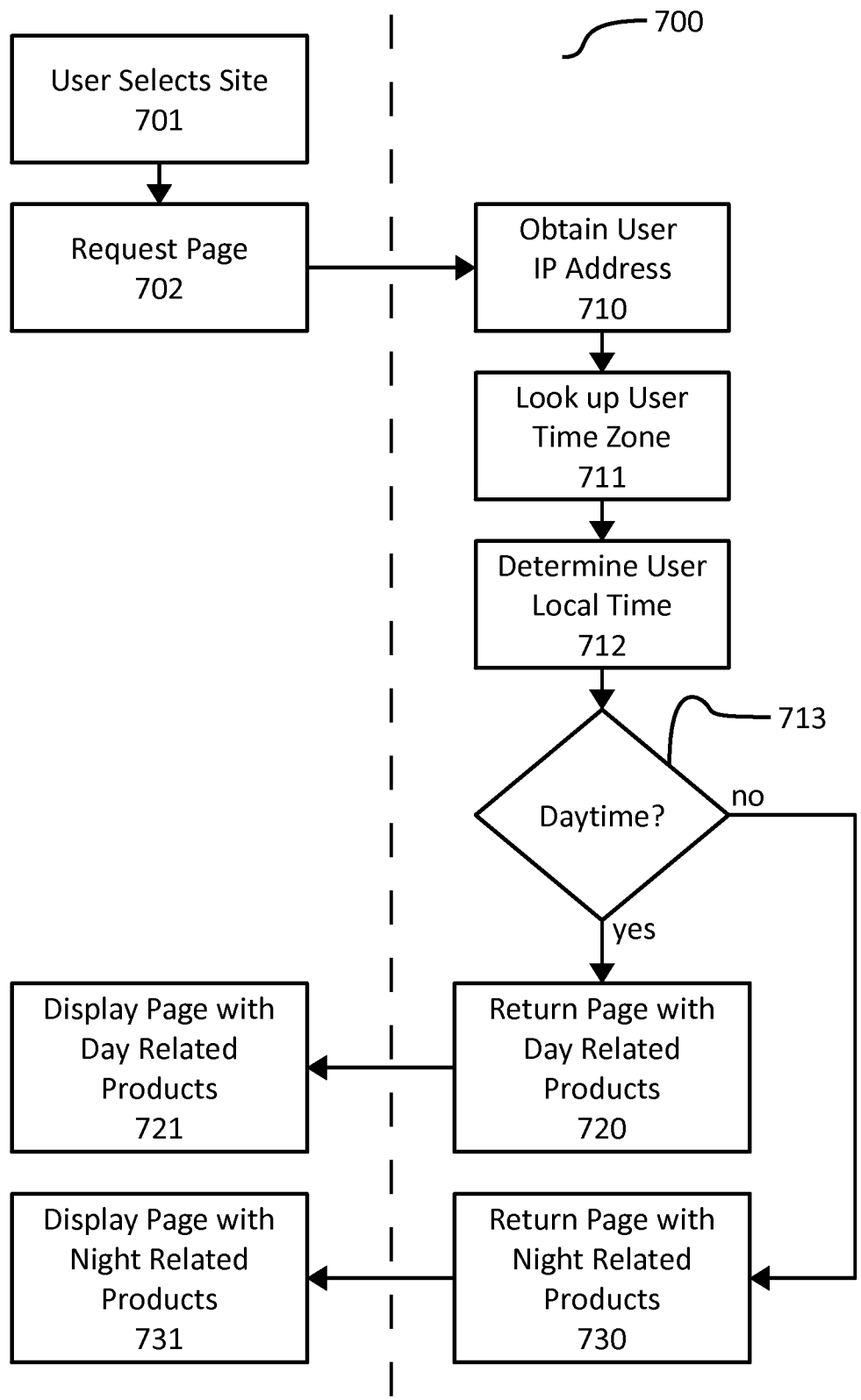
FIG. 7 is a flowchart showing an exemplary method for changing products included in a response based on the time of day.

Referring now to FIG. 7, flowchart 700 shows an exemplary method for changing products included in a response based on the time of day. At steps 701 and 702 the user selects the site and the browser sends a request to the application. At step 710, the application determines an Internet protocol (IP) address of the client system. At step 711 the application determines a time zone for the user based on the IP address (e.g., using a GeoIP database) and at step 712 determines the user's local time by adjusting for the time zone. At step 713 the application determines the current time period, e.g. "daytime", for the user of the remote client. At step 720, the application returns a page based on the current time period. For example, if it is "daytime" at step 720 the application may return a page including business use or other "daytime" products on the page. Otherwise, at step 730 the application may return a page including other information for home use or "nighttime" products on the page.

Figure 8:
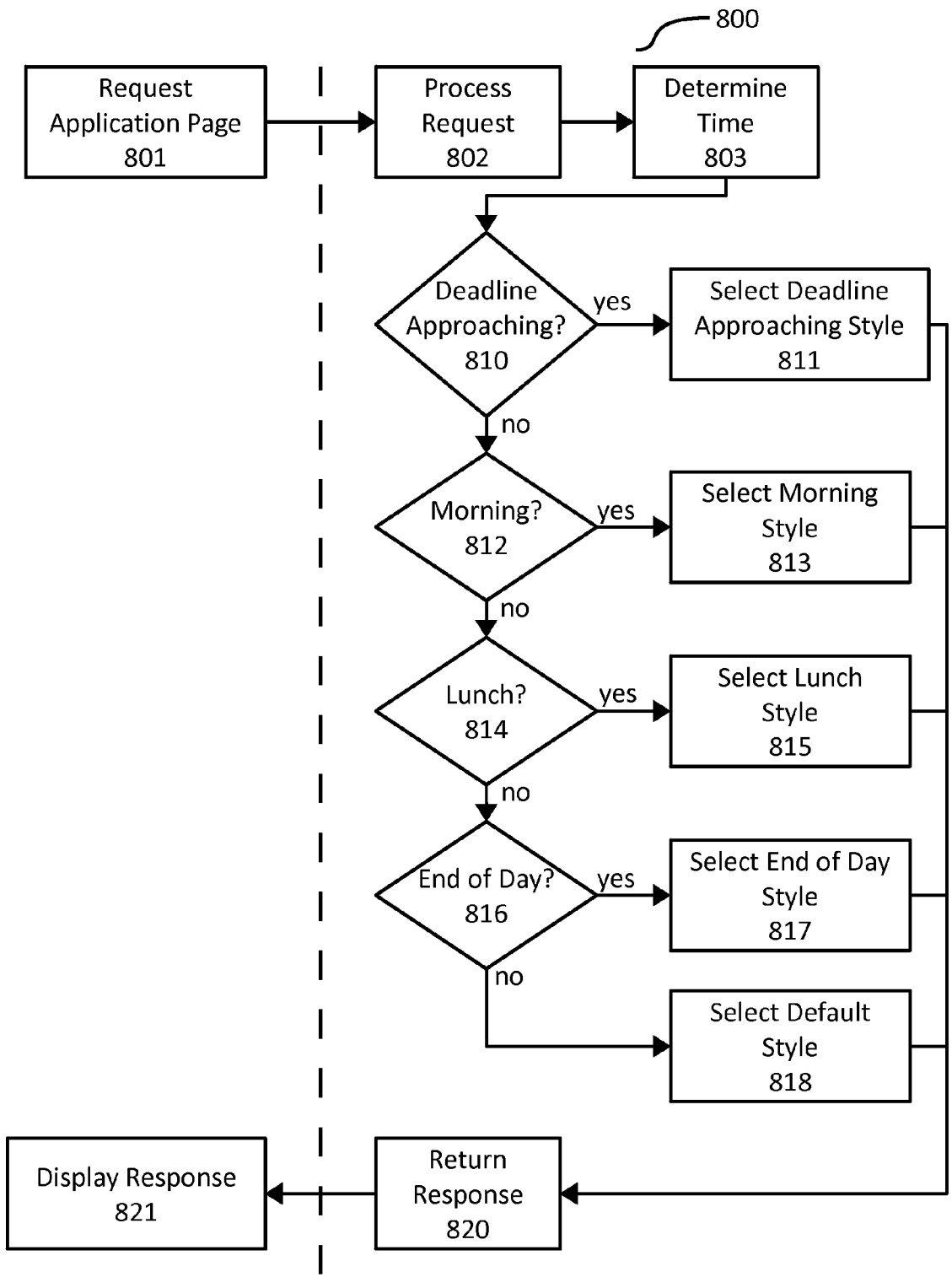
FIG. 8 is a flowchart showing an exemplary method for changing display styles in a response based on the time of day.

Referring now to FIG. 8, flowchart 800 shows an exemplary method for changing display styles in a response based on the time of day. An exemplary web application may generally be styled with primarily black text on a white background, with blue trim. Throughout the day, the remote client may request application pages at step 801, either in response to user activity or in response to scripts or other application logic executed on the client. The application processes the request at step 802, and at least part of the processing may include steps 803-818 to modify the display of the site in response to the time of day. Thus at step 803 the application determines the current time. In steps 810, 812, 814, and 816 the application may compare the current time to one or more predefined time periods (e.g., deadline approaching, morning, lunchtime, end of day) and adjust style components appropriately at steps 811, 813, 815, 817, and 818.

Thus, as the day progresses the default blue trim may change appearance slightly, becoming lighter during the mornings and through the afternoon, and progressively darker through late afternoon through evening, and very dark blue at night. For a business application or corporate intranet site, for example, the application may unobtrusively give workers an update on the relative time of day. While a digital clock included with most operating systems provides a specific time of day, the coloring could provide timing subtle cues to the user. For example, a schedule component may fade to gray during lunch break for a worker, fade to red if an action hasn't been taken in a given amount of time, fade to black as the dedicated call center hour's end of day approaches, etc.

Thus, the present invention provides methods, software, and computer systems for changing the user interface of a web application dynamically depending on the time at which the Web server is accessed in order to give the user quicker, easier, or automatic access to items, pages, data, or screens they need, without the user having to explicitly select or request these particular components.

It should be understood that the foregoing description is merely an example of the invention and that modifications and may be made thereto without departing from the spirit and scope of the invention and should not be construed as limiting the scope of the invention. The scope of the invention, therefore, should be determined with respect to the appended claims, including the full scope of equivalents thereof.

The invention claimed is:

1. A method in a computer processing system, the method comprising:
  receiving a request from a remote client;
  determining a time of day for the request;
  determining that the time of day for the request is within a current time period of a plurality of defined time periods, each defined time period having a corresponding one or more interface components, each interface component having a corresponding interface component type and corresponding data defining characteristics of the interface component type;
  determining a time of last login by the remote client and/or a user of the remote client;
  determining that the time of last login meets a condition that the time of last login be within the current time period, the condition associated with one or more further interface components, each further interface component also having a corresponding interface component type and corresponding data defining characteristics of the interface component type;
  selecting, responsive to determining that the time of day for the request is within the current time period and that the time of last login meets the condition, at least one of the corresponding one or more interface components for the current time period and at least one further interface component associated with the condition; and
  returning a response to the client, the response including the corresponding interface component type and the data defining the characteristics of the corresponding interface component type for each of the selected corresponding interface components and for each of the selected further interface components, wherein the data defining the characteristics of at least one of the one or more interface component types includes data selected from the group consisting of: (a) instructions and/or formatting information for displaying the data related to the task to a user of the remote client and (b) instructions and/or formatting information governing user interaction with the data via the interface component type on the remote client.

2. The method of claim 1, wherein at least one of the one or more selected interface component types is configured to provide data related to a task associated with the time of day.

3. The method of claim 1, further comprising:
further selecting one or more of the interface components based on a duration of a period between the time of the last login and the time of day for the request.

4. The method of claim 1, further comprising:
creating and/or accessing session data corresponding to the request; and
setting a session duration for the session data based on the time for the request.

5. The method of claim 1, further comprising:
determining a time zone for the remote client and/or user of the remote client; and
selecting one or more of the interface components based on the time of day for the request as adjusted for the time zone.

6. The method of claim 1, further comprising:
selecting a plurality of current time periods from the plurality of pre-defined time periods based on the time of day for the request; and
selecting an additional one or more interface components based on the one or more current time periods.

7. The method of claim 1, further comprising:
determining a date for the request; and
selecting one or more of the interface components based on the time of day and the date.

8. A non-transitory computer-readable medium storing computer-executable instructions, the computer-executable instructions including instructions for controlling one or more processors to:
receive a request from a remote client;
determine a time of day for the request;
determine that the time of day for the request is within a current time period of a plurality of defined time periods, each defined time period having a corresponding one or more interface components, each interface component having a corresponding interface component type and corresponding data defining characteristics of the interface component type;
determine a time of last login by the remote client and/or a user of the remote client;
determine that the time of last login meets a condition that the time of last login be within the current time period, the condition associated with one or more further interface components, each further interface component also having a corresponding interface component type and corresponding data defining characteristics of the interface component type;
select, responsive to determining that the time of day for the request is within the current time period and that the time of last login meets the condition, at least one of the corresponding one or more interface components for the current time period and at least one further interface component associated with the condition; and
return a response to the client, the response including the corresponding interface component type and the data defining the characteristics of the corresponding interface component type for each of the selected corresponding interface components and for each of the selected further interface components, wherein the data defining the characteristics of at least one of the one or more interface component types includes data selected from the group consisting of: (a) instructions and/or formatting information for displaying the data related to the task to a user of the remote client and (b) instructions and/or formatting information governing user interaction with the data via the interface component type on the remote client.

9. The non-transitory computer-readable medium of claim 8, wherein at least one of the selected interface component types is configured to provide data relating to a task associated with the time of day.

10. The non-transitory computer-readable medium of claim 9, the computer-executable instructions further including instructions for controlling the one or more processors to further select one or more of the interface components based on a duration of a period between the time of the last login and the time of day for the request.

11. The non-transitory computer-readable medium of claim 9, the computer-executable instructions further including instructions for controlling the one or more processors to:
create and/or access session data corresponding to the request; and
set a session duration for the session data based on the time for the request.

12. The non-transitory computer-readable medium of claim 8, the computer-executable instructions further including instructions for controlling the one or more processors to:
determine a time zone for the remote client and/or a user of the remote client; and
select one or more of the interface components based on the time of day for the request as adjusted for the time zone.

13. A computer processing system comprising:
one or more processors; and
a memory, the memory storing computer-executable instructions for controlling the one or more processors to:
receive a request from a remote client;
determine a time of day for the request;
determine that the time of day for the request is within a current time period of a plurality of defined time periods, each defined time period having a corresponding one or more interface components, each interface component having a corresponding interface component type and corresponding data defining characteristics of the interface component type;
determine a time of last login by the remote client and/or a user of the remote client;
determine that the time of last login meets a condition that the time of last login be within the current time period, the condition associated with one or more further interface components, each further interface component also having a corresponding interface component type and corresponding data defining characteristics of the interface component type;
select, responsive to determining that the time of day for the request is within the current time period and that the time of last login meets the condition, at least one of the corresponding one or more interface components for the current time period and at least one further interface component associated with the condition; and
return a response to the client, the response including the corresponding interface component type and the data defining the characteristics of the corresponding interface component type for each of the selected corresponding interface components and for each of the selected further interface components, wherein the data defining the characteristics of at least one of the one or more interface component types includes data selected from the group consisting of: (a) instructions and/or formatting information for displaying the data related to the task to a user of the remote client and (b) instructions and/or formatting information governing user interaction with the data via the interface component type on the remote client.

14. The computer processing system of claim 13, wherein at least one of the selected interface component types is configured to provide data relating to a task associated with the time of day.

15. The computer processing system of claim 14, wherein the computer-executable instructions further include instructions for controlling the one or more processors to further select one or more of the interface components based on a duration of a period between the time of the last login and the time of day for the request.

16. The computer processing system of claim 14, wherein the computer-executable instructions further include instructions for controlling the one or more processors to:
- create and/or access session data corresponding to the request; and
- set a session duration for the session data based on the time for the request.

17. The computer processing system of claim 13, wherein the computer-executable instructions further include instructions for controlling the one or more processors to:
- determine a time zone for the remote client and/or a user of the remote client; and
- select one or more of the interface components based on the time of day for the request as adjusted for the time zone.

* * * * *